(12) United States Patent
Mitsugi et al.

(10) Patent No.: US 12,333,372 B2
(45) Date of Patent: Jun. 17, 2025

(54) WIRELESS TAGS AND WIRELESS TAG SYSTEM

(71) Applicants: KEIO UNIVERSITY, Tokyo (JP); DENSO WAVE INCORPORATED, Aichi-pref. (JP)

(72) Inventors: Jin Mitsugi, Fujisawa (JP); Haruki Sakabe, Chita-gun (JP)

(73) Assignees: KEIO UNIVERSITY, Tokyo (JP); DENSO WAVE INCORPORATED, Aichi (JP)

( * ) Notice: Subject to any disclaimer, the term of this patent is extended or adjusted under 35 U.S.C. 154(b) by 0 days.

(21) Appl. No.: 18/276,840

(22) PCT Filed: Jan. 26, 2022

(86) PCT No.: PCT/JP2022/002952
§ 371 (c)(1),
(2) Date: Aug. 10, 2023

(87) PCT Pub. No.: WO2022/176550
PCT Pub. Date: Aug. 25, 2022

(65) Prior Publication Data
US 2024/0127025 A1    Apr. 18, 2024

(30) Foreign Application Priority Data

Feb. 16, 2021   (JP) ................................. 2021-022361

(51) Int. Cl.
*G06K 19/077* (2006.01)
*G06K 19/07* (2006.01)
*H04B 5/45* (2024.01)

(52) U.S. Cl.
CPC ............................ *G06K 19/07773* (2013.01)

(58) Field of Classification Search
CPC ......... G06K 19/07773; G06K 19/0723; G06K 7/0008; G06K 7/10316; G06K 19/0712;
(Continued)

(56) References Cited

U.S. PATENT DOCUMENTS 7,058,357 B1 *   6/2006   Wuidart ........... G06K 19/07777
                                                     340/572.1
7,256,682 B2 *   8/2007   Sweeney, II ....... G06K 7/10336
                                                       340/8.1
(Continued)

FOREIGN PATENT DOCUMENTS

EP      1742172 A1 *   1/2007   ......... G06K 19/0701
JP   2013216147 A  *  10/2013   ......... G06K 19/0701

OTHER PUBLICATIONS

Ou, "Come and Be Served: Parallel Decoding for COTS RFID Tags" (Year: 2015).*
(Continued)

*Primary Examiner* — Thien T Mai
(74) *Attorney, Agent, or Firm* — Oliff PLC

(57) ABSTRACT

A passive wireless tag to identify a given command which has been received, even while responding to a wireless tag communication device. In this wireless tag, radio waves serving as a predetermined command are received from a wireless tag communication device via an antenna and an RF switch. Signal components are detected from the received radio waves by the detection circuit. The detected signal components are sampled by the sampling circuit in accordance with the timing when the RF switch is controlled to its ON state by a predetermined control signal. The time interval of the ON state is set to be sufficiently shorter than a transfer cycle of the received radio waves. The control (Continued)

circuit thus identifies the foregoing predetermined command according to the sampling results obtained from the sampling circuit.

6 Claims, 6 Drawing Sheets

(58) Field of Classification Search
CPC .......... G06K 7/10336; G06K 7/10019; G06K 19/0707; G06K 7/10366; G06K 19/0701; G06K 17/00; G06K 7/10297; G06K 7/10039; G06K 19/0709; G06K 7/10089; G06K 7/10861; G06K 7/10009; H04B 5/45; H04B 5/24; H04B 3/06; H04B 1/18; H04B 1/0458; H04B 5/48; H04B 2203/5425; H04B 3/16; H04B 1/3827
See application file for complete search history.

(56) References Cited

U.S. PATENT DOCUMENTS 10,154,649 B2 * 12/2018 Hill ..................... A01K 15/021
2007/0115098 A1 * 5/2007 Dobkin ............. G06K 19/0723
340/10.2

OTHER PUBLICATIONS

Impedance matching properties of an inhomogeneous matching layer with continuously changing acoustic impedance (Year: 1982).*
Chan, P. et al. "Full duplex reflection amplifier tag". IET Microwaves, Antennas & Propagation, 2013, vol. 7, No. 6, pp. 415-420.
Pebay-Peyroula, F. et al. "A true full-duplex communication between HF contactless reader and card". IEEE International Conference on RFID-Technologies and Applications. 2011, pp. 473-478.
Rajoria, Nitish et al.; "Concurrent Backscatter Streaming from Batteryless and Wireless Sensor Tags with Multiple Subcarrier Multiple Access"; IEICE Transaction on Communication; vol. E100-B; No. 12; Dec. 2017; pp. 2121-2128.
Liu, Wanchun et al.; "Full-Duplex Backscatter Interference Networks Based on Time-Hopping Spread Spectrum"; IEEE Transactions on Wireless Communications; vol. 16; No. 7; Jul. 2017; pp. 4361-4377.

* cited by examiner

FIG.4
(A)
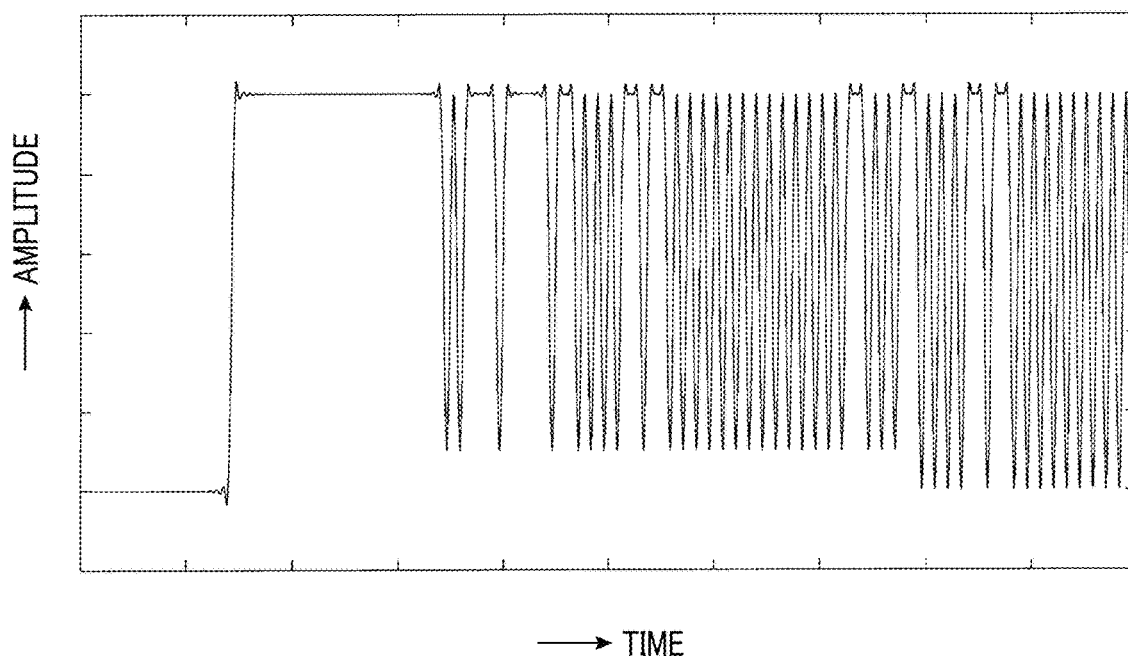
⟨WAVEFORM OF DOWNLINK RADIO WAVES⟩
(B)
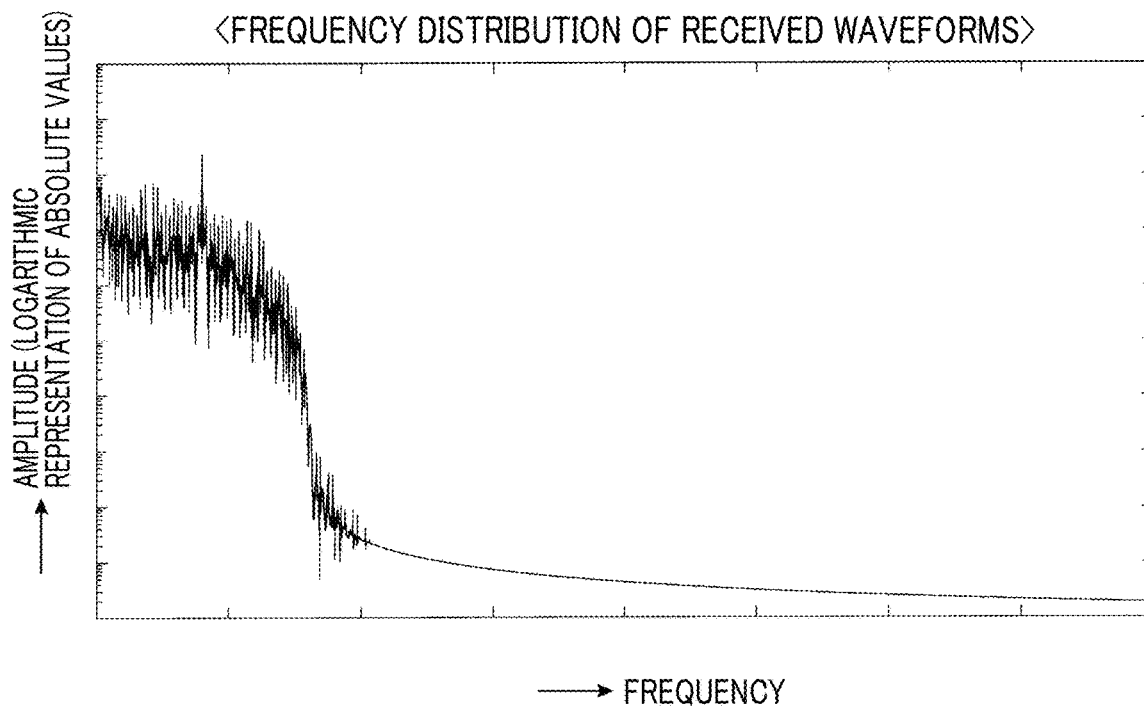
⟨FREQUENCY DISTRIBUTION OF RECEIVED WAVEFORMS⟩

FIG.5
(A)
<WAVEFORM OF DOWNLINK RADIO WAVES>
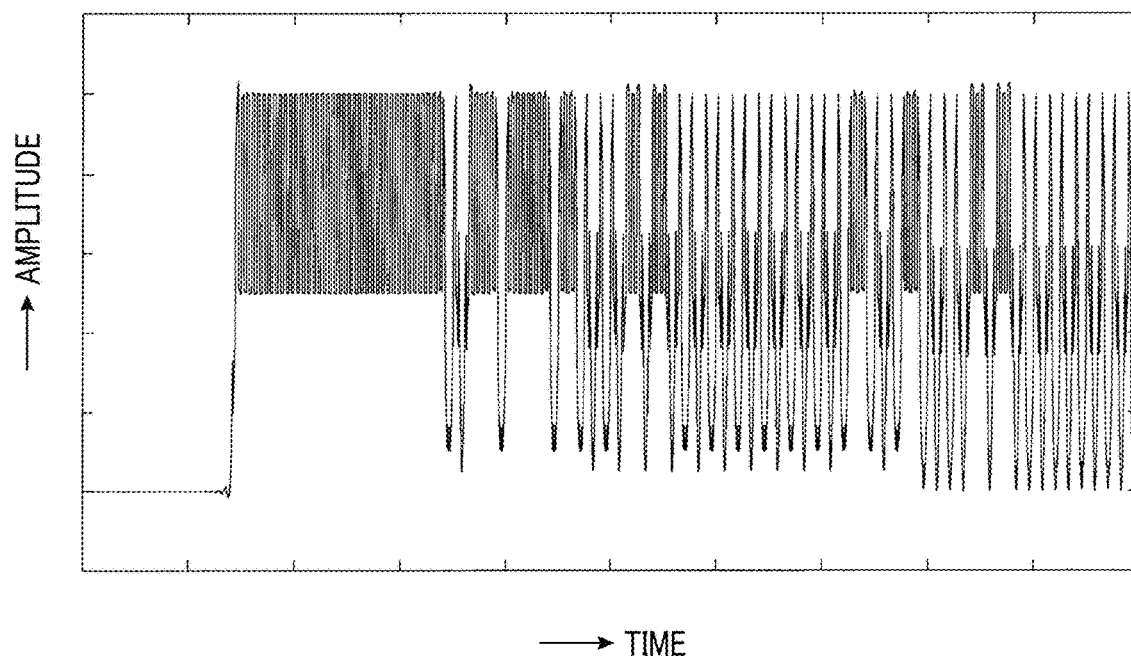
(B)
<FREQUENCY DISTRIBUTION OF RECEIVED WAVEFORMS>
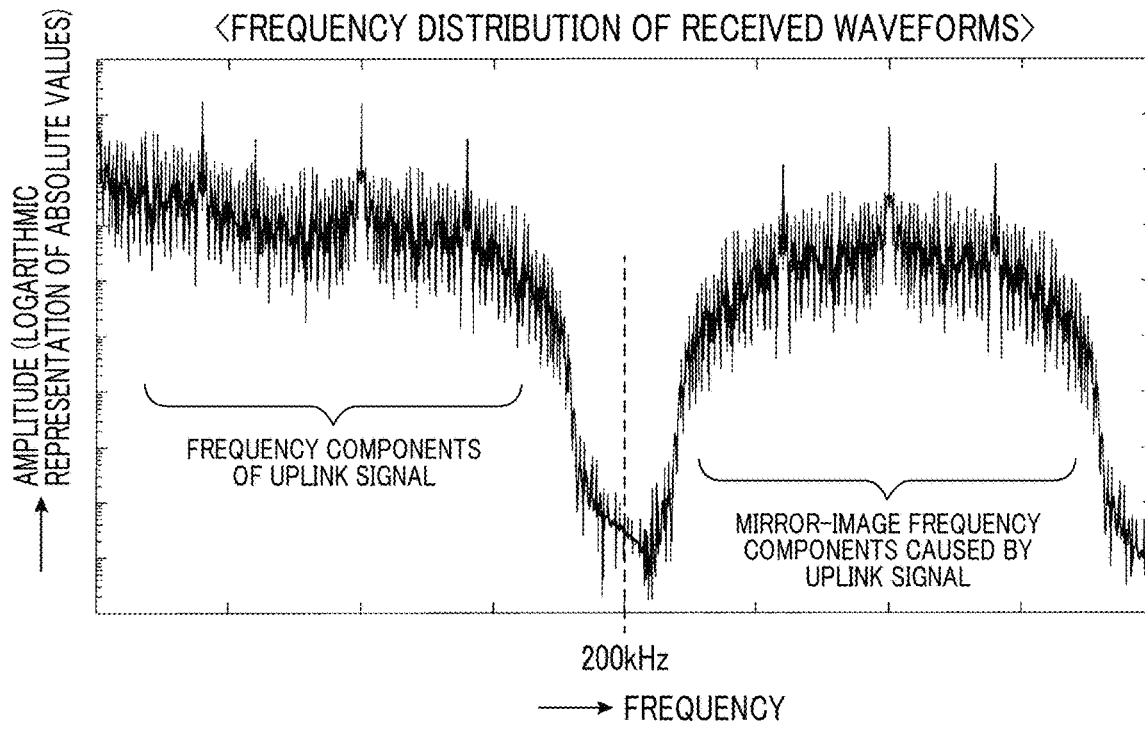

WIRELESS TAGS AND WIRELESS TAG SYSTEM

CROSS-REFERENCE TO RELATED APPLICATION

This application is based on and claims the benefit of priority from earlier Japanese Patent Application No. 2021-022361 filed on Feb. 16, 2021 the description of which is incorporated herein by reference.

BACKGROUND

Technical Field

The present invention relates to a wireless tag and a wireless tag system, and in particular to a passive wireless tag and a wireless tag system with such a passive wireless tag.

Related Art

Wireless tag systems are widely used, in which wireless tags such as RF tags and wireless tag communication devices such as wireless tag readers and wireless tag reader/writers communicate wirelessly in bilateral directions. Passive wireless tags are often used in such wireless tag systems. This passive wireless tag is able to obtain operating power from unmodulated waves received from a wireless tag communication device, and hence is able to operate without an internal power source. The passive wireless tag configured in this way sends a response signal to the wireless tag communication device. Backscatter and subcarrier methods can be used as a transmission method for sending the response signal. In this method, the RF switch (tag modem circuit) is repeatedly switched between an ON state (impedance matched state) and an OFF state (open state or short state) in response to the unmodulated wave from the wireless tag communication device. Hence, the reflected components are caused to be located, on the frequency axes, at a position which is detuned from that of the above unmodulated wave.

For example, the wireless tag system disclosed in Non-Patent Document 1 below is known as a technology related to the wireless tag system that employs the backscatter and subcarrier methods. In this wireless tag system, when the communication path from the wireless tag communication device to the wireless tag is defined as a downlink and the communication path from the wireless tag to the wireless tag communication device is defined as an uplink (return link), the subcarrier method is used. Use of this method makes it possible that the uplink frequency is detuned in frequencies from the downlink frequency, and the uplink frequency components are suppressed by an analog low-pass filter (LPF) in the wireless tag, whereby downlink reception is possible during uplink transmission.

CITATION LIST

Patent Literature

[Non Patent Literature 1]
P. Chan and V. Fusco, "Full duplex reflection amplifier tag," IET Microwaves, antennas & Propagation, vol. 7, No. 6, pp. 415-420, 2013.doi: 10.1049/iet-map. 2012. 0441

Recently, a sensor data streaming technique, by which multiple passive wireless tags each have a sensor function and sensor data (detection results) are received sequentially from each wireless tag, is being adopted. In such a sensor data streaming technique, it is possible to envision situations such as when it is necessary to instruct a portion of the respective wireless tags that have started streaming to stop transmission, reset, etc.

However, if a backscatter wireless tag tries to receive a command while responding to the wireless tag communication device, the demodulated waveform changes due to the on/off switchovers of the RF switch. This makes it impossible to identify the received commands.

SUMMARY

Thus it is desired to provide a passive wireless tag having a configuration that enables identification of a predetermined command received even while responding to a wireless tag communication device, and a wireless tag system equipped with such a wireless tag configuration.

In order to realize the foregoing object, a first aspect of the present disclosure is provided as a radio tag system comprising:
a radio tag communication device; and
a passive radio tag transmitting a response signal to the radio tag communication device using a backscatter method and a subcarrier method,
wherein the passive radio tag comprises:
an antenna,
an RF switch connected to the antenna and controlled to be turned to ON/OFF states when transmitting the response signal,
a control circuit that controls the ON/OFF states of the RF switch such that the response signal is transmitted via the antenna by outputting a predetermined control signal to the RF switch,
a detection circuit that detects signal components from the received radio wave received as a predetermined command from the wireless tag communication device via the antenna and the RF switch, and
a sampling circuit for sampling the signal components detected by the detection circuit in accordance with timing at which the RF switch is controlled to the ON state by the predetermined control signal,
wherein the time interval of the ON state is set to be shorter than a transfer cycle of the received radio wave, and
the control circuit identifies the predetermined command according to a sampling result of the sampling circuit.

A second aspect of the present disclosure is provided as a passive radio tag (20) that transmits a response signal to a radio tag communication device using a backscatter method and a subcarrier method,
wherein the passive radio tag comprises:
an antenna,
an RF switch connected to the antenna and controlled to be turned to ON/OFF states when transmitting the response signal,
a control circuit that controls the ON/OFF states of the RF switch such that the response signal is transmitted via the antenna by outputting a predetermined control signal to the RF switch,
a detection circuit that detects signal components from the received radio wave received as a predetermined command from the wireless tag communication device via the antenna and the RF switch, and a sampling circuit for sampling the signal components detected by the detection circuit in accordance with timing at which the RF switch is controlled to the ON state by the predetermined control signal, wherein the time interval of the ON state is set to be shorter (preferably ⅛ or less, more preferably 1/10 or less) compared to a transfer cycle of the received radio wave, and the control circuit identifies the predetermined command based on a sampling result of the sampling circuit.

The symbols in each of the above brackets indicate the correspondence with the specific means described in the embodiments described below, and are not intended to be interpreted in a limiting manner when interpreting the claims.

Effects of Invention

In the foregoing first and second aspects, a predetermined control signal is outputted to the RF switch from the control circuit of the wireless tag. In response to the output of this control signal, the RF switch is controlled to be turned ON/OFF which enables the response signal to be transmitted through the antenna. Then, signal components are detected by the detection circuit from the received radio waves received as prescribed commands from the wireless tag communication device via the antenna and the RF switch. Such detected signal components are sampled by the sampling circuit in accordance with the timing at which the RF switch is controlled to be turned to the ON state by the predetermined control signal. The response signal is generated by superimposing digital data on the subcarrier signal based on an exclusive OR logical operation. Hence, the ON/OFF states of the RF switch are not always constantly repetitive. In an exemplary embodiment, the time interval of the ON state is set to be sufficiently short (preferably 1/10 or less, more preferably ⅛ or less) compared to the transfer cycle of the received radio waves. The control circuit identifies the above predetermined command according to the sampling results performed by the sampling circuit.

Thus, the signal components sampled by the sampling circuit are sampled in accordance with the timing when the RF switch is controlled to be turned to the ON state. Therefore, waveforms demodulated according to the sampling result are not significantly affected by the ON/OFF states of the RF switch. For this reason, the predetermined command received from the wireless tag communication device can be identified with sufficient accuracy on the basis of the demodulated waveform as described above. In particular, the time interval of the ON state is set to be sufficiently shorter than the transfer cycle of the received radio waves. Therefore, a single value in the received radio waves are sampled at multiple locations, whereby sampling omissions can be reduced. It is thus possible to realize a passive wireless tag that can identify received commands even while responding to the wireless tag communication device.

BRIEF DESCRIPTION OF THE DRAWINGS

In the accompanying drawings:

FIG. 4, part (A) thereof, is a graph exemplifying a reception waveform of downlink radio waves received during an always ON state of an RF switch and FIG. 4, (B) thereof, is a graph showing a frequency distribution of the reception waveform shown in part (A) of FIG. 4;

FIG. 5, part (A) thereof, is a graph exemplifying a reception waveform of downlink radio waves received under ON/OFF control of the RF switch and FIG. 5, (B) thereof, is a graph showing a frequency distribution of the reception waveform shown in part (A) of FIG. 5.

DESCRIPTION OF EMBODIMENTS

First Embodiment

With reference to the accompanying drawings, a first embodiment of a wireless tag system and a wireless tag provided in the wireless tag system, which are according to the present invention, will be described below.

Figure 1:
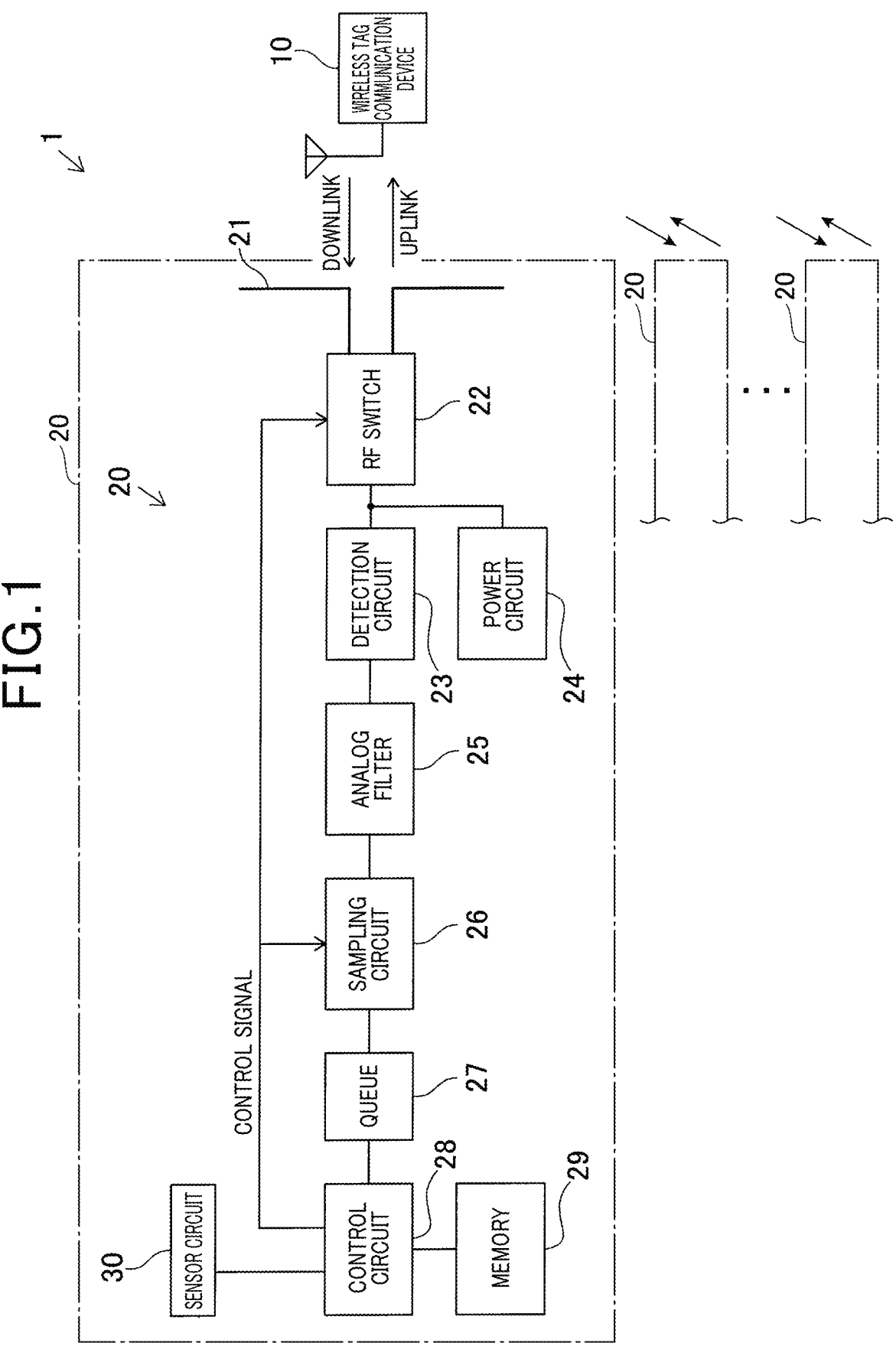
FIG. 1 is a block diagram outlining a wireless tag system and a wireless tag according to a first embodiment.

The wireless tag system 1 shown in FIG. 1 is configured as a system in which a wireless tag 20, such as an RF tag, and a wireless tag communication device 10, such as a wireless tag reader or a wireless tag reader/writer (devices that communicate with wireless tags), are able to perform two-way wireless communication therebetween.

Specifically, the wireless tag system 1 is able to manage a plurality of wireless tags 20, each equipped with a sensor function to detect predetermined data. The wireless tag system 1 is configured to perform sensor data streaming, in which sensor data (detection results) transmitted from each of the wireless tags 20 is sequentially received by the wireless tag communication device 10. In the present embodiment, the wireless communication direction from the wireless tag communication device 10 to the wireless tag 20 is referred to as the downlink, while the wireless communication direction from the wireless tag 20 to the wireless tag communication device 10 is referred to as the uplink (return link). For convenience, FIG. 1 illustrates only one of the multiple 20 wireless tags to be managed in detail by a functional block.

The wireless tag 20 adopted in the present embodiment is a passive type of wireless tag and is configured to operate without an internal power source by obtaining operating power from unmodulated waves received from the wireless tag communication device 10. The wireless tag 20 uses a backscatter method and a subcarrier method to transmit a response signal to the wireless tag communication device 10. This backscatter and subcarrier methods are based on a technique with which the RF switch 22 is repeatedly and selectively switched to ON (i.e., impedance matched state) and OFF (i.e., open state) to unmodulated waves from the wireless tag communication device 10 and the reflected components are shifted to frequency positions detuned from the above unmodulated waves by mutually superimposing, using an exclusive OR logical operation, bits of digital information to be transmitted in each of the intervals of an integer multiple of the repetitions.

Figure 2:
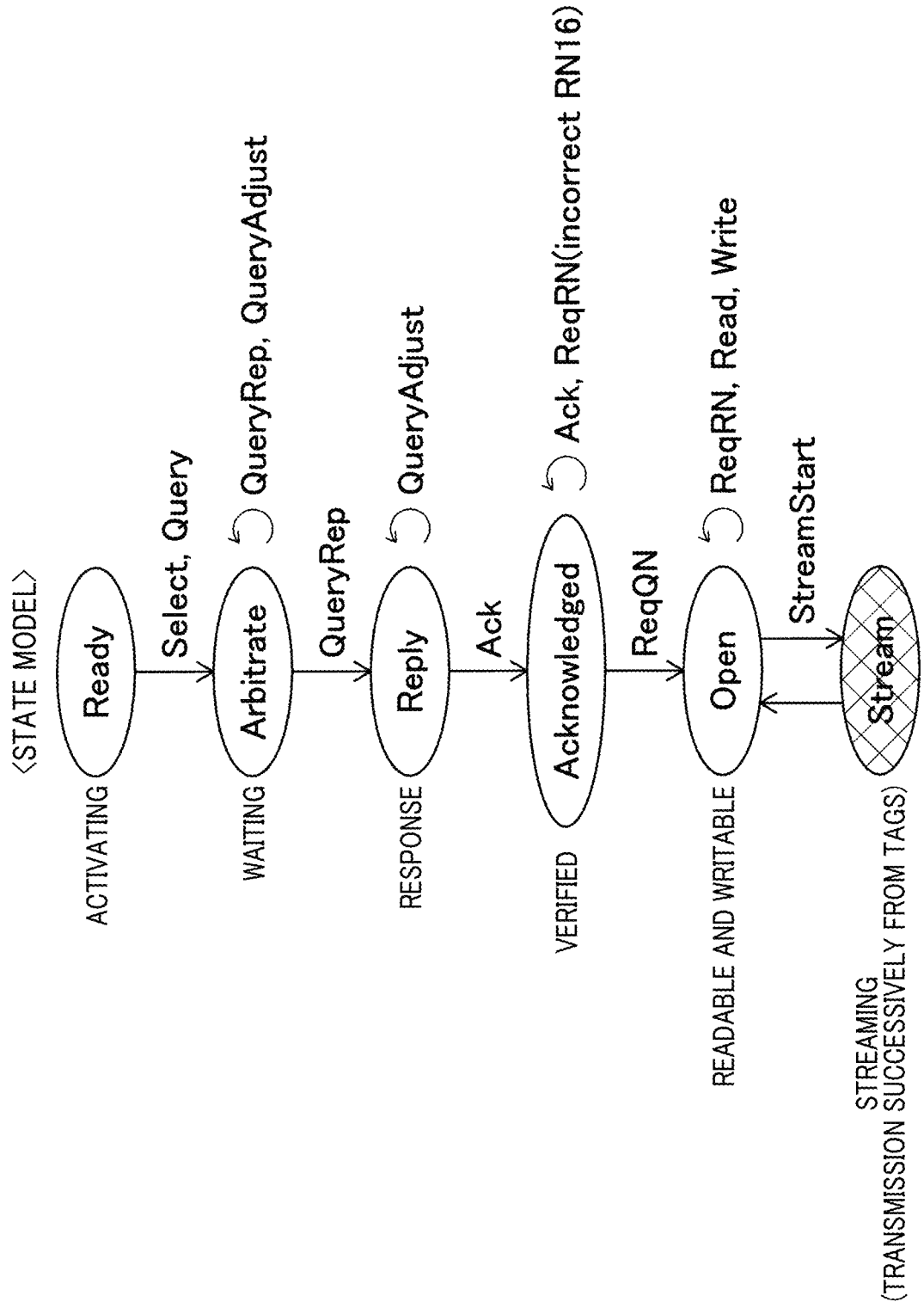
FIG. 2 is an illustration showing how the wireless tag changes its state model in the first embodiment.

In particular, the present embodiment is intended to realize sensor data streaming as described above. To achieve this streaming, the wireless tag 20 can be configured to introduce stream states, and to start and stop streaming in those stream states, as shown in the state model in FIG. 2, in contrast to the conventional state model.

Therefore, as shown in FIG. 1, the wireless tag 20 is equipped with an antenna 21, an RF switch 22, a detection circuit 23, a power circuit 24, an analog filter 25, a sampling circuit 26, a queue 27, a control circuit 28, a memory 29, and a sensor circuit 30.

The RF switch 22 is connected to the antenna 21 and configured to function as a tag modem circuit. This RF switch 22 is controlled to be turned ON/OFF (i.e., turned repetitively to ON and OFF states thereof) by the control circuit 28 when transmitting the response signal. In response to this control, the RF switch 22 can be configured as a switch that switches the reflectivity of the antenna between a matched state during its ON control and an open state during its OFF control. In the matched state, radio wave energy from the wireless tag communication device 10 is efficiently transmitted to the detection circuit 23. Therefore, reflections of radio waves on the upper link are reduced, while the reflections of radio waves on the upper uplink are increased in the open state. Such reflections, which are increased or reduced, allow for digital circuits of the uplink. A circuit implementation in which the open state is replaced by the short state is also possible, but even in that case, the principle of realizing digital circuits based on the difference in reflectance from the impedance matched state is the same.

The detection circuit 23 is configured to perform envelope detection on downlinked radio waves received via the antenna 21 and the RF switch 22. In this way, the detection circuit 23 functions as a circuit to remove carrier wave components from the received radio waves.

The power circuit 24 is configured to rectify, smooth, and boost the downlinked radio waves (i.e., unmodulated waves) received from the wireless tag communication device 10 via the antenna 21 and the RF switch 22, thereby generating operating power. The generated operating power is supplied to the control circuit 28, the sensor circuit 30, and other circuit elements.

The analog filter 25 is configured to extract only signal components of the downlinked radio waves from the radio waves whose carrier wave components have been removed by the detection circuit 23. As a result, noise in the unwanted bands is removed. It is noted that the downlink bandwidth must be sufficiently lower than a subcarrier frequency for the streaming state, which will be discussed later. For this reason, the filter may be configured to remove different bands of noise in both the streaming state and states other than the streaming state in response to control from the control circuit 28.

The sampling circuit 26 is controlled by the control circuit 28 such that the sampling circuit 26 functions as a circuit to sample (thin out) signal components extracted by the analog filter 25 at predetermined timings, which will be described below, when the RF switch 22 is controlled to be turned ON and OFF.

The queue 27 is configured such that the ON/OFF timing of the RF switch 22 serves as a circuit to absorb time lags between sampling and digital processing, which are caused depending on uplink digital data transfer cycles.

The control circuit 28 is a circuit for managing the state model of the wireless tag 20 and is configured to perform processing in response to signal components of the radio waves on the downlink obtained via the queue 27, i.e., in response to a predetermined command received from the wireless tag communication device 10. In addition, when transmitting the uplink radio waves as a response signal to the wireless tag communication device 10, the control circuit 28 is configured to perform ON/OFF control of the RF switch 22 by a predetermined control signal outputted in response to the response signal.

In particular, the control circuit 28 in the present embodiment enables reception of the downlink radio waves while transmitting the uplink radio waves. In other words, in the present embodiment, even while responding to the wireless tag communication device 10, the commands received from this wireless tag communication device 10 can be identified. Therefore, the transmission and reception process are performed to demodulate and decode downlink the radio waves using data sampled by the sampling circuit 26, in accordance with the timing when the RF switch 22 is controlled to its ON state. In order to reduce leakage in sampling performed by the sampling circuit 26, the time interval (i.e., ON/OFF interval) of the ON state of the RF switch 22 is set to be sufficiently shorter (e.g., preferably ⅛ or shorter), compared to the transfer cycle (time interval) of the downlink radio waves (i.e., the received radio waves). The transmission and reception processes will be described below.

In the present embodiment, the inventors have determined the foregoing time interval of the ON state as follows. Generally, the sampling period ($\Delta T$) should be half of its transfer cycle (, which is a Nyquist frequency). Therefore, taking into account the errors of the sampling period and also the possibility that ¼ of the period of the highest frequency is insufficient, it is recommended that the time interval of the ON state be set to, at least, ⅛ of the period of the highest frequency or less than such ⅛ period. In an experimental implementation conducted by the inventors, the time interval of the ON state was set to be ¹⁄₁₀ of the transfer cycle of the downlink radio waves (i.e., received radio waves) or less than such ¹⁄₁₀ transfer cycle of the downlink radio waves.

The memory 29 is composed of various semiconductor memories such as ROM, EEPROM, etc. This memory 29 stores control programs, identification information (tag ID) to identify the wireless tag 20, data detected by the sensor circuit 30, data according to the application of the wireless tag 20, and other necessary data.

The sensor circuit 30 is a circuit for detecting strain about an object site where the wireless tag 20 is installed. The sensor circuit 30 is controlled by the control circuit 28, and sensed data, which is the result of the detection, is stored in the memory 29.

Next, the configuration of the wireless tag communication device 10 that receives sensed data (i.e., detection results) from the respective wireless tags 20 will now be described with reference to FIG. 3.

Figure 3:
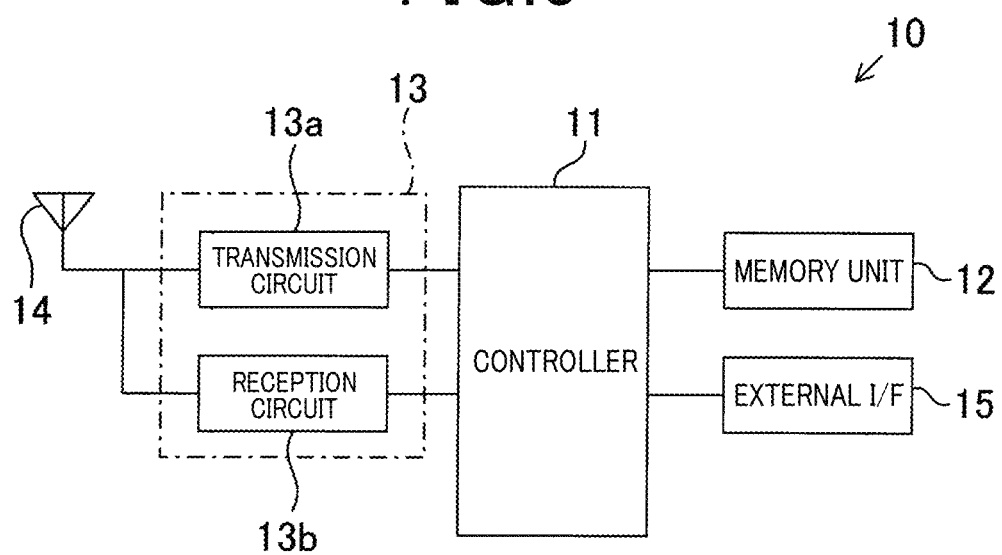
FIG. 3 is a block diagram outlining the configuration of the wireless tag communication device shown in FIG. 1.

As shown in FIG. 3, the wireless tag communication device 10 is equipped with elements including a control unit 11, a memory unit 12, a communication processing unit 13, an antenna 14, and an external interface 15. The control unit 11 is provided with a microcomputer, serving as a key element, which has a CPU, a system bus, input/output interfaces, etc. The control unit 11 and the memory unit 12 provided with semiconductor memories compose an information processing apparatus.

The communication processing unit 13 is equipped with a transmission circuit 13a, a reception circuit 13b, and other elements (not shown), as shown in FIG. 3. The transmission circuit 13a is composed of, for example, a carrier oscillator, an encoder, a modulator and an amplifier. The carrier oscillator outputs a carrier wave at a predetermined frequency. The encoder is connected to the control unit 11 and encodes data to be transmitted, which are outputted from the control unit 11, and outputs the encoded data to the modulator. The modulator receives both a carrier (carrier wave) from the carrier oscillator and the transmission data from the encoder. The modulator is configured to modulate the carrier (carrier wave), which is outputted from the carrier oscillator, according to ASK (Amplitude Shift Keying) modulation based on encoded transmission codes (transmission signal) outputted from the encoder when sending commands to an object to be communicated. The modulator is also configured to provide the amplifier with the modulated signal. The amplifier amplifies the inputted signal (i.e., the modulated signal outputted from the modulator) at a preset gain. The amplified signal is thus outputted to the antenna 14 as downlink radio wave signals (i.e., signals to be transmitted).

The antenna 14 is connected to the input terminal of the reception circuit 13b, so that the uplink radio wave signals (received signals) received by antenna 14, which correspond to a response wave from the wireless tag 20, is inputted to the reception circuit 13b. The reception circuit 13b is composed of, for example, an amplifier, demodulator, etc. In the reception circuit 13b, the signal received by the antenna 14 is amplified by the amplifier, and the amplified signal is demodulated by the demodulator. Therefore, a signal corresponding to the demodulated signal waveform is outputted to the control unit 11 as received data.

The external interface 15 is configured as an interface for data communication with external devices such as a management server, and is configured to perform communication processing in cooperation with the control unit 11.

Next, the transmission/reception processes performed by the control circuit 28 will now be described, which is for enabling the identification of received commands even during the response to the wireless tag communication device 10.

When using the conventional wireless tag which is operable on the backscatter method, unmodulated waves from the wireless tag communication device are repeatedly switched on and off by the RF switch, whereby uplink radio waves generated by the RF switch are then transmitted as a response signal. In this case, if reception of downlink radio waves is attempted while transmitting the uplink radio waves, the demodulated waveform will change due to the fact that the RF switch is turned on and off.

Specifically, it is assumed, for example, that downlink radio waves received via an RF switch controlled in the always-on state are demodulated as shown in part (A) of FIG. 4. In this assumption, if its downlink radio waves are received via an ON/OFF controlled RF switch, the demodulated reception waveform changes, as shown in part (A) of FIG. 5 relative to the reception waveform in part (A) of FIG. 4 due to the ON/OFF switchover of the RF switch. In other words, as can be seen from the comparison between part (B) of FIG. 5, which shows the frequency distribution of the reception waveform in part (A) of FIG. 5, and part (B) of FIG. 4, which shows the frequency distribution of the reception waveform in part (A) of FIG. 4, a mirror image is caused in a subcarrier frequency band around a frequency of 200 kHz due to the ON/OFF switchover of the RF switch, although this is just one example.

Figure 6:
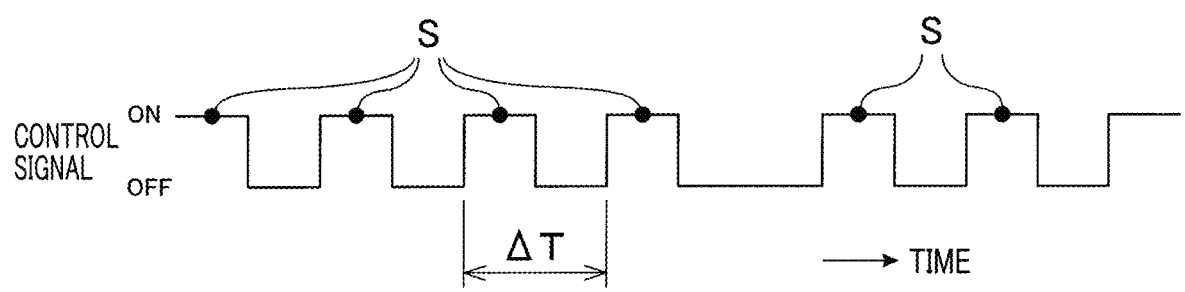
FIG. 6 is a timing chart explaining a relationship between the ON/OFF control of the RF switch and sampling timing at a sampling circuit.

Therefore, in this implementation, demodulation and decoding of downlink radio waves are devised in the transmission and reception process performed by the control circuit 28. In other words, as shown in FIG. 6, the sampling circuit 26 performs sampling in accordance with the timing when the RF switch 22 is controlled to the ON state (impedance matched state) in response to the above predetermined control signal (see a reference numeral S shown in FIG. 6). After time smoothing is applied to those sampled data (sampling results) using the queue 27, the downlink radio waves are subjected to the demodulation and decoding.

Therefore, as shown in FIG. 1, the signal equivalent to the predetermined control signal outputted from the control circuit 28 to the RF switch 22 is inputted to the sampling circuit 26. Hence, in the sampling circuit 26, the signal components extracted by the analog filter 25 are sampled (thinned out) at the timing of the ON state of the RF switch 22, where the timing is recognized by the foregoing equivalent signal.

Thus, since the signal components are sampled at the timing of the ON state of the RF switch 22, even during periods when the ON/OFF control timing of RF switch 22 is back and forth in time on the uplink digital signal, the downlink radio waves can be demodulated and decoded without being substantially affected by the ON/OFF control of the RF switch 22.

In particular, in the present embodiment, the time interval of the ON state of the RF switch 22 (see reference symbol ΔT (ON/OFF cycle) in FIG. 6) is set to be sufficiently shorter (⅛ or less interval as described above) than the transfer cycle of downlink radio waves (i.e., the received radio waves). This suppresses sampling omissions because a single value in the downlink radio waves is sampled multiple times.

This configuration allows each of the wireless tags 20 to receive another command from the wireless tag communication device 10 in the sensed data streaming state where the sensed data are sent to the wireless tag communication device 10 in response to a predetermined command coming from the wireless tag communication device 10. For example, the wireless tag communication device 10 may send a command to stop transmission to only some of the 20 wireless tags that are transmitting their sensed data. In this case, the wireless tag 20 with the stop instruction can receive the command to stop transmission from the sampling results that coincide with the timing when RF switch 22 is controlled to its ON state.

As explained above, in the wireless tag system 1 according to the present embodiment, The predetermined control signal CC is outputted to the RF switch 22 by the control circuit 28 of each of the wireless tags 20. This controls the RF switch 22 to be turned ON/OFF so that a response signal is transmitted from the wireless tag 20 to the wireless tag communication device 10 through the antenna 21. Then, signal components are detected by the detection circuit 23 from radio waves received, as a predetermined command, from the wireless tag communication device 10 via the antenna 21 and the RF switch 22. The detected signal components are sampled by the sampling circuit 26 at the timing when the RF switch 22 is controlled to its ON state according to the foregoing predetermined control signal. The response signal is generated by superimposing digital data on a subcarrier signal using an exclusive OR logical operation. That is, the ON/OFF states of RF switch 22 are not always constantly repetitive. In that generation, the time interval of the ON state is set to be sufficiently shorter than the transfer cycle of the received radio waves, as described before. Therefore, the foregoing predetermined command is identified by the control circuit 28 depending on the sampling results of the sampling circuit 26.

The signal components to be sampled by the sampling circuit 26 are sampled in accordance with the timing when the RF switch 22 is controlled to its ON state. Hence, waveforms demodulated according to the sampling results are not significantly affected by the ON/OFF control of the RF switch 22. Thus, based on the demodulated waveforms, it is possible to identify, in a fully accurate manner, a predetermined command received from the wireless tag communication device 10. In particular, the time interval of the ON state is set to be sufficiently shorter than the transfer cycle of the received radio waves, so that a single value in the received radio waves is sampled at multiple locations, thus preventing the sampling from being omitted, or reducing such omitted sampling events. Thus, it is possible to realize a passive wireless tag 20 that is capable of identifying received commands even while responding to the wireless tag communication device 10.

The present disclosure is not limited to the foregoing embodiment, but may be modified, for example, as follows.

(1) The sensor circuit 30 is not limited to being configured as a circuit for detecting strain, but may also be configured as a circuit for detecting temperature, for example. Not all of the sensor circuits 30 provided in the respective wireless tags 20 need always be configured as circuits for detecting strain. By way of example, the sensor circuits 30 provided in some of the wireless tags 20 may be configured as circuits for detecting strain, while the sensor circuits 30 arranged in remaining wireless tags 20 may be configured as circuits for detecting temperature.

(2) Commands sent to the wireless tag 20 that is transmitting sensed data are not limited to the above-mentioned command to stop the transmission. This command may be, for example, a command to change the modes regarding the processing performed by the wireless tag 20 itself, or to reset operations of the wireless tag 20.

DESCRIPTION OF PARTIAL REFERENCE SIGNS

1 . . . wireless
10 . . . wireless tag communication device
20 . . . wireless tag
21 . . . antenna
22 . . . RF switch
23 . . . detection circuit
24 . . . power circuit
25 . . . analog filter
26 . . . sampling circuit
27 . . . queue
28 . . . control circuit
29 . . . memory
30 . . . sensor circuit

What is claimed is:

1. A radio tag system comprising:
   a radio tag communication device; and
   a passive radio tag transmitting a response signal to the radio tag communication device according to a backscatter method and a subcarrier method,
   wherein the passive radio tag comprises:
      an antenna,
      an RF switch connected to the antenna and controlled to be turned ON/OFF such that the antenna is controlled to two states, turning ON the RF switch corresponding to an impedance matched state of the antenna when transmitting the response signal,
      a control circuit that controls the RF switch such that the response signal is transmitted via the antenna by outputting a predetermined control signal to the RF switch,
      a detection circuit that detects signal components from the received radio wave received as a predetermined command from the radio tag communication device via the antenna and the RF switch, and
      a sampling circuit that samples the signal components detected by the detection circuit in accordance with timing at which the RF switch is controlled to the matched state by the predetermined control signal,
   wherein a time interval of the matched state is set to be shorter than a symbol duration of the received radio wave, and
   the control circuit identifies the predetermined command based on a sampling result of the sampling circuit.

2. A passive radio tag that transmits a response signal to a radio tag communication device using a backscatter method and a subcarrier, wherein the passive radio tag comprises:
   an antenna,
   an RF switch connected to the antenna and controlled to be turned ON/OFF such that the antenna is controlled to two states, turning ON the RF switch corresponding to is an impedance matched state of the antenna when transmitting the response signal,
   a control circuit that controls the RF switch such that the response signal is transmitted via the antenna by outputting a predetermined control signal to the RF switch,
   a detection circuit that detects signal components from the received radio wave received as a predetermined command from the radio tag communication device via the antenna and the RF switch, and
   a sampling circuit that samples the signal components detected by the detection circuit in accordance with timing at which the RF switch is controlled to the matched state by the predetermined control signal,
   wherein a time interval of the matched state is set to be shorter than a symbol duration of the received radio wave, and
   the control circuit identifies the predetermined command based on a sampling result of the sampling circuit.

3. The radio tag system according to claim 1, wherein the time interval of the matched state is set to be ⅛ or less compared to the symbol duration of the received radio waves.

4. The radio tag system according to claim 1, wherein the time interval of the matched state is set to be 1/10 or less compared to the symbol duration of the received radio waves.

5. The passive radio tag according to claim 2, wherein the time interval of the matched state is set to be ⅛ or less compared to the symbol duration of the received radio waves.

6. The passive radio tag according to claim 2, wherein the time interval of the matched state is set to be 1/10 or less compared to the symbol duration of the received radio waves.

* * * * *